(12) United States Patent
Deb

(10) Patent No.: US 9,710,403 B2
(45) Date of Patent: Jul. 18, 2017

(54) POWER SAVING METHOD AND APPARATUS FOR FIRST IN FIRST OUT (FIFO) MEMORIES

(75) Inventor: Sutirtha Deb, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 89 days.

(21) Appl. No.: 13/997,209

(22) PCT Filed: Nov. 30, 2011

(86) PCT No.: PCT/US2011/062591
§ 371 (c)(1),
(2), (4) Date: Aug. 13, 2014

(87) PCT Pub. No.: WO2013/081597
PCT Pub. Date: Jun. 6, 2013

(65) Prior Publication Data
US 2014/0351542 A1    Nov. 27, 2014

(51) Int. Cl.
*G06F 12/00*     (2006.01)
*G06F 13/00*     (2006.01)
(Continued)

(52) U.S. Cl.
CPC .......... *G06F 12/145* (2013.01); *G06F 1/3212* (2013.01); *G06F 1/3275* (2013.01);
(Continued)

(58) Field of Classification Search
CPC .... G06F 1/3212; G06F 1/3225; G06F 1/3234; G06F 1/3237; G06F 1/3243;
(Continued)

(56) References Cited

U.S. PATENT DOCUMENTS 5,524,248 A * 6/1996 Parks .................... G06F 1/3215
                                                          711/104
5,710,736 A * 1/1998 Masuda et al. .......... 365/189.07
(Continued)

FOREIGN PATENT DOCUMENTS

JP    2003036145 A * 2/2003    ............... G06F 3/06
JP    2003036145 A * 2/2003

OTHER PUBLICATIONS

Definition of contiguous; Merriam-Webster Online Dictionary; retrieved from http://www.merriam-webster.com/dictionary/contiguous on Dec. 10, 2015 (1 page).*
(Continued)

*Primary Examiner* — Daniel C Chappell

(57) ABSTRACT

In various embodiments, apparatuses and methods are disclosed to keep a memory clock gated when the data for a current memory address is the same as the data in the immediate previous memory address. For a write function, new data will only be written into the current memory address if it is different from the data in the immediate previous memory address. Similarly, for a read function, the data will only be read out of the current memory address if it is different from the data in the immediate previous memory address. Each row in the memory may have one associated status bit outside the memory. Data may only be written to or read from the current memory address when the status bit is set. Clock gating the memory ports may reduce the overall power consumption of the memory.

33 Claims, 8 Drawing Sheets

(51) Int. Cl.
*G06F 13/28* (2006.01)
*G06F 12/14* (2006.01)
*G06F 1/32* (2006.01)

(52) U.S. Cl.
CPC ... *G06F 2212/1028* (2013.01); *Y02B 60/1225* (2013.01); *Y02B 60/1228* (2013.01); *Y02B 60/1292* (2013.01)

(58) Field of Classification Search
CPC .... G06F 1/3268; G06F 1/3275; G06F 1/3287; G06F 3/0625; G06F 12/1416; G06F 12/145; G06F 12/1458; G06F 2212/1028; G06F 2212/16; G06F 2212/161; G06F 2212/165; G06F 2212/17; G06F 2212/171; G06F 2212/20; G06F 2212/202; G06F 2212/2022; G06F 2212/2024; G06F 2212/2028; G06F 2212/205; G06F 2212/206; Y02B 60/1225; Y02B 60/1228; Y02B 60/1278; Y02B 60/1282; Y02B 60/1285; Y02B 60/1292
USPC .......................................................... 711/163
See application file for complete search history.

(56) References Cited

U.S. PATENT DOCUMENTS

| | | | | |
|---|---|---|---|---|
| 6,052,789 A * | 4/2000 | Lin | .................. | G06F 1/3203 365/229 |
| 6,327,203 B1 * | 12/2001 | Won | .................. | G11C 11/4096 365/189.07 |
| 7,081,897 B2 * | 7/2006 | Garg | .................. | G06F 1/3203 345/543 |
| 7,165,165 B2 * | 1/2007 | Woodbridge | ....... | G06F 12/0215 711/204 |
| 7,298,642 B2 | 11/2007 | Ise | | |
| 7,580,273 B2 * | 8/2009 | Rao | .................. | 365/63 |
| 7,813,197 B2 * | 10/2010 | Shin | .................. | 365/205 |
| 9,311,228 B2 * | 4/2016 | Daly | .................. | G06F 12/023 |
| 2002/0138243 A1 * | 9/2002 | Asada | .................. | 703/14 |
| 2006/0044867 A1 * | 3/2006 | Ise | .................. | 365/158 |
| 2008/0046103 A1 * | 2/2008 | Ashida | ................ | G05B 19/054 700/86 |
| 2009/0089526 A1 * | 4/2009 | Kuo | .................. | G06F 21/79 711/163 |
| 2012/0166710 A1 * | 6/2012 | Ou | .................. | G06F 12/0246 711/103 |

OTHER PUBLICATIONS

Machine translation of JP 2003036145 A; AIPN; retrieved Dec. 11, 2015 (9 pages).*

Managing the evolution of flash: beyond memory to storage; Kim, Tony; 2010 IEEE Hot Chips 22 Symposium; Aug. 22-24, 2010 (35 pages).*

An approach for adaptive DRAM temperature and power management; Liu et al; Proceedings of the 22nd annual international conference on Supercomputing; Jun. 7-12, 2008; pp. 63-72 (10 pages).*

International Search Report and Written Opinion mailed Jul. 11, 2012 for corresponding PCT/US2011/062591 filed Nov. 30, 2011 (ten (10) pages).

* cited by examiner

FIG. 4
400

| | Wr_data | | Status | Wr_en | Wr_addr | | Rd_data |
|---|---|---|---|---|---|---|---|
| 110 | D | Wr_clk_gate | 0 | 0 | 17 | Rd_clk_gate | prev |
| | D | | 1 | 1 | 16 | | new |
| | C | | 1 | 1 | 15 | | new |
| | B | Wr_clk_gate | 0 | 0 | 14 | Rd_clk_gate | prev |
| | B | Wr_clk_gate | 0 | 0 | 13 | Rd_clk_gate | prev |
| | B | Wr_clk_gate | 0 | 0 | 12 | Rd_clk_gate | prev |
| | B | | 1 | 1 | 11 | | new |
| Memory | A | | 1 | 1 | 10 | | new |
| Depth | B | | 1 | 1 | 9 | | new |
| = 18 | A | | 1 | 1 | 8 | | new |
| | C | Wr_clk_gate | 0 | 0 | 7 | Rd_clk_gate | prev |
| | C | Wr_clk_gate | 0 | 0 | 6 | Rd_clk_gate | prev |
| | C | Wr_clk_gate | 0 | 0 | 5 | Rd_clk_gate | prev |
| | C | | 1 | 1 | 4 | | new |
| | B | | 1 | 1 | 3 | | new |
| | A | Wr_clk_gate | 0 | 0 | 2 | Rd_clk_gate | prev |
| | A | Wr_clk_gate | 0 | 0 | 1 | Rd_clk_gate | prev |
| | A | | 1 | 1 | 0 | | new |

600

700

800

POWER SAVING METHOD AND APPARATUS FOR FIRST IN FIRST OUT (FIFO) MEMORIES

BACKGROUND

Memory components operating on a first in, first out (FIFO) scheme within computer systems can consume significant amounts of power during system operation. Power is consumed each time a read and/or a write to the FIFO memory is executed. Frequently, the FIFO memory stores the same data in consecutive memory addresses. In such cases, reading and writing to memory addresses that are storing the same data as the previous address may be inefficient in terms of power consumption. Accordingly, there may be a need for improved techniques to solve these and other problems.

BRIEF DESCRIPTION OF THE DRAWINGS

FIG. 4 illustrates rows of memory containing example data illustrating embodiments of the disclosure.

DETAILED DESCRIPTION

Figure 1:
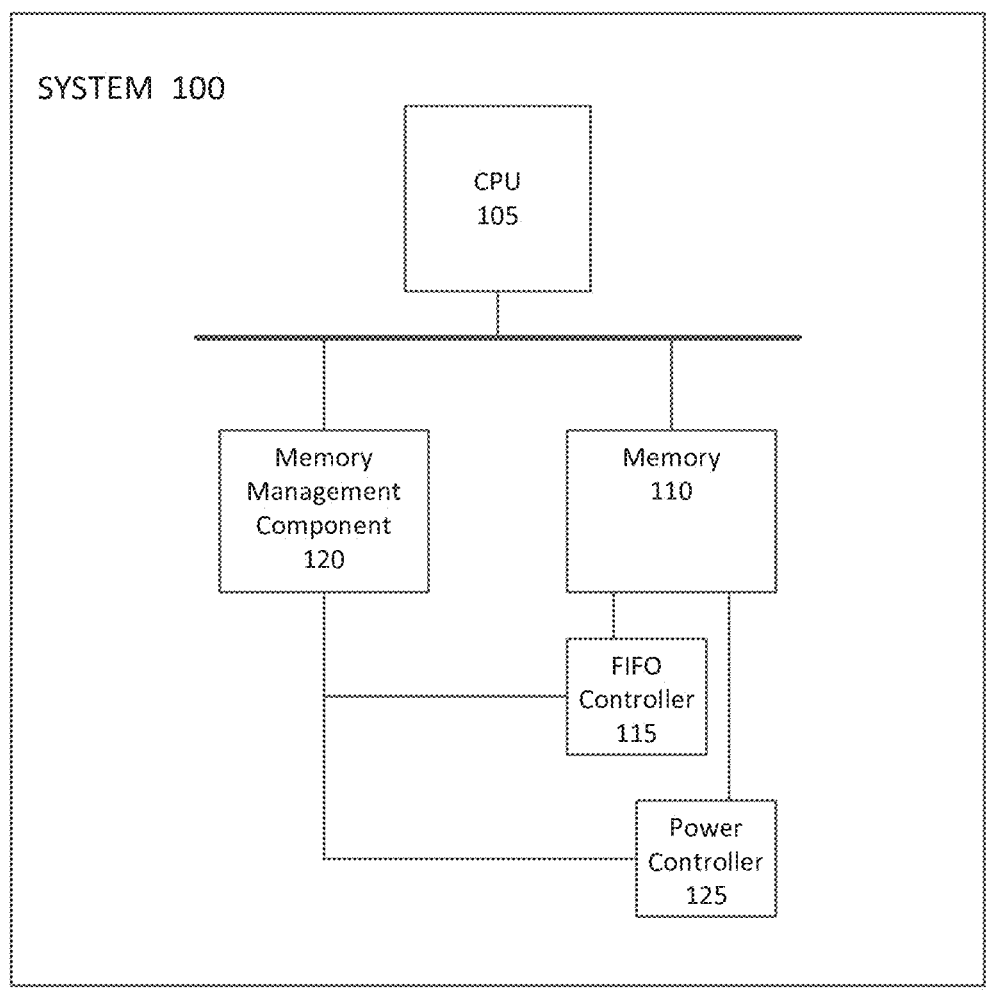
FIG. 1 illustrates a block diagram of a system according to an embodiment.

Some memory systems such as FIFO memory systems utilize a contiguous address scheme. In such a FIFO memory system, the stored data may be identical for periodic stretches of consecutive memory addresses. When the data is identical for consecutive memory addresses it may not be necessary to actually perform a read or write to the memory when the data of the immediate previous memory address is the same.

In various embodiments, apparatuses and methods are disclosed that may be able to keep the memory clock gated or the read/write enable signals low or otherwise keep the memory in a low power state when the data for a current memory address is the same as the data in the immediate previous memory address. For a write function, the new data will only be written into the current memory address if it is different from the data in the immediate previous memory address. Similarly, for a read function, the data will only be read out of the current memory address if it is different from the data in the immediate previous memory address.

To assist in determining when the data associated with a current memory address is the same as the data associated with the immediate previous memory address, each row in the memory may have one associated status bit outside the memory. Each time new data arrives, the new data may be compared against the last incoming data and if the new data is different, the associated status bit is set. If the new data is the same as the previous data, the associated status bit is cleared. Similarly, data may only be written to the current memory address when the status bit is set. Data will not be written to the current memory address when the status bit is cleared. Data may only be read from the current memory address when the status bit is set. Data will not be read from the current memory address when the status bit is cleared. Clock gating the memory ports in the instances described below may reduce the overall power consumption of the memory component of the system. Clock gating refers to turning off the clock signal to a component which has the effect of disabling that component. If the system is operating on battery power, the implementations described below may be able to extend the life of the battery. In addition, other power saving approaches may also be used when the status bit is cleared such as, for instance, keeping write/read enable signals low or keeping memory in another low power state.

Memory may be implemented as a volatile memory device such as, but not limited to, a Random Access Memory (RAM), Dynamic Random Access Memory (DRAM), or Static RAM (SRAM). The memory may be implemented on devices including a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram of a system or apparatus 100 according to an embodiment. Apparatus 100 may be a computing platform comprised of a central processing unit (CPU) 105 communicatively coupled with a memory device 110 and a memory management component 120. The memory management component 120 may be operative to determine when the apparatus 100 is operating on battery power as opposed to an external DC source. When operating on battery power, the apparatus 100 may have need to conserve power to extend the life of the battery. The memory management component 120 may include a logic architecture 200 like that illustrated in FIG. 2 operative to implement the clock gating memory scheme described below. The memory management component 120 may be communicatively coupled to a FIFO controller 115 operative to control access to the memory 110 under normal operating conditions. The memory management component 120 may also be communicatively coupled to a power controller 125 operative to implement a logic architecture capable of selectively controlling access to the memory 110.

Figure 2:
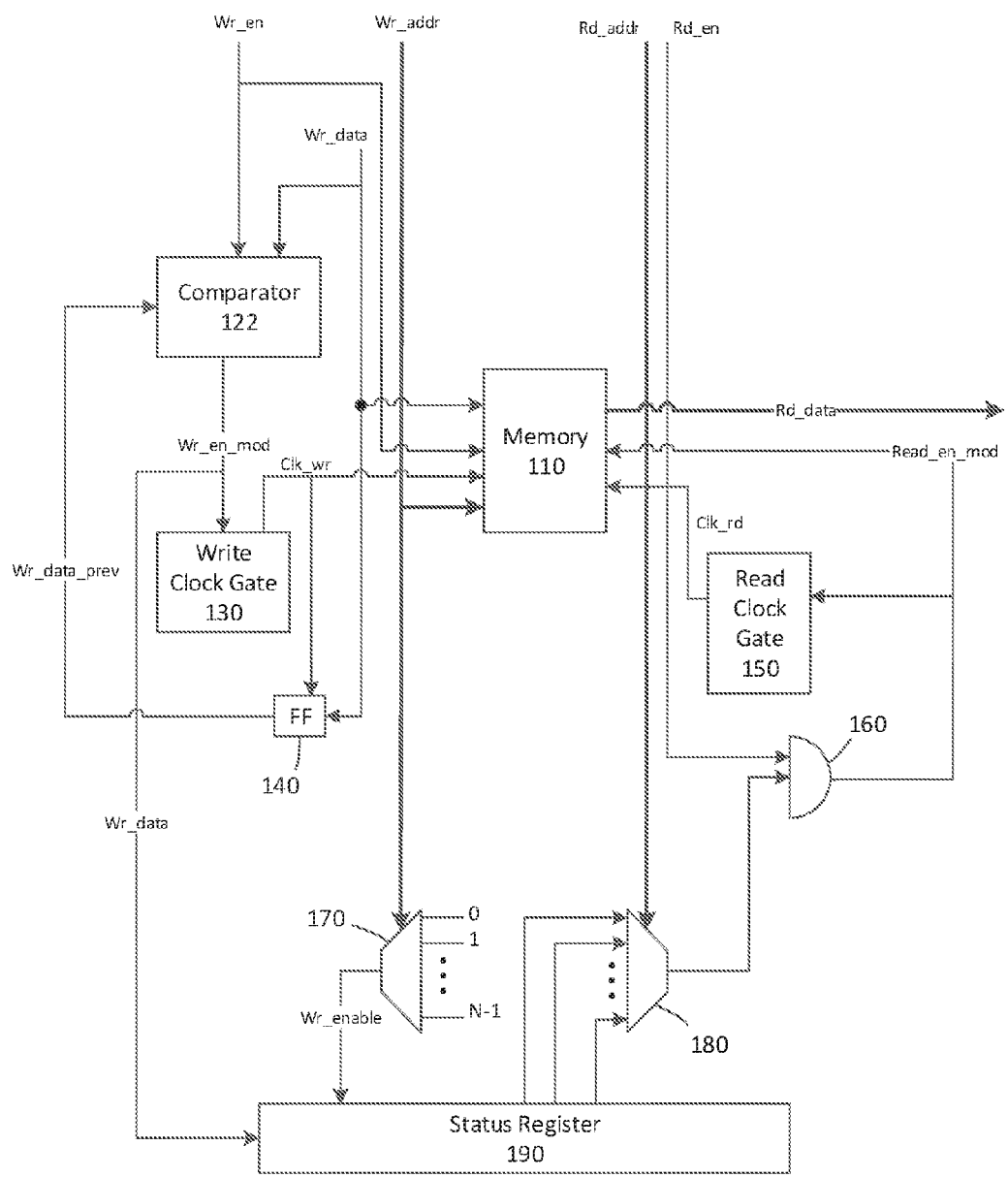
FIG. 2 illustrates a logic architecture according to an embodiment.

FIG. 2 illustrates a logic architecture 200 according to an embodiment. The logic architecture 200 may be under control of the memory management component 120. The memory 110 may function based on the specific results and input associated with logic 200. The logic architecture 200 may be split into two functions—write logic and read logic. The write logic may be generally shown on the left side of FIG. 2 while the read logic may be generally shown on the right side of FIG. 2. Each will be addressed separately.

The write logic includes a comparator 122 that receives as input the current write data intended for a current write address in memory 110 and the previous write data associated with the immediate previous address in memory 110 with the help of flip flop (FF) 140.

When the comparator 122 determines that the current write data is different than the previous write data it forwards a signal to a write clock gate 130 that allows the write clock gate 130 to operate as normal because the write data is different than the previous write data. A status bit that is outside of memory 110 but is associated with the current write address is set high in status register 190 with the aid of a write address decoder 170 which selects a particular status bit based on the write address.

When the comparator 122 determines that the current write data is the same as the previous write data it forwards a signal to a write clock gate 130 that causes the write clock gate 130 to prevent the write port to the memory 110 from functioning because the write data is the same as the previous write data. In alternative embodiments, a power gate or any other power saving scheme may be used to prevent access to memory 110 and save power when the write data is the same as the immediately previous data. For instance, the write enable (Wr_en) signal to the memory 110 may be forced low (e.g., logical "0") when the write data is the same as the immediately previous data. A status bit that is outside of memory 110 but is associated with the current write address is cleared in status register 190 using the write address decoder 170.

The read logic includes an AND gate 160 that receives as input a read enable (Rd_en) signal and the status bit setting in status register 190 for the read address in memory 110. The status bit setting may be either a logical "0" when the status bit is cleared or a logical "1" when the status bit is set high according to a read address decoder 180. Since the read enable will be set to "1", the AND gate 160 will only fire when the status bit is also "1" indicative that the data sought to be read from the current memory address is different than the data in the previous memory address. In this case, the read clock gate will allow the read port to memory 110 to operate normally and the data will be read out as requested. The data will also be held in register outside the memory 110.

If the status bit is set to logical "0", the AND gate 160 will not fire and the read clock gate may be shut down and/or the read enable (Rd_en) may be forced low to logical "0" to prevent the read port to memory 110 from functioning because the data sought to be read is the same as in the previous memory address. This data has been previously held in a register outside of memory 110 and will be sent out to the requesting application or process being executed by CPU 105. Forcing the read enable signal to the memory to 0 keeps the read address unchanged when the status bit is "0".

Figure 3:
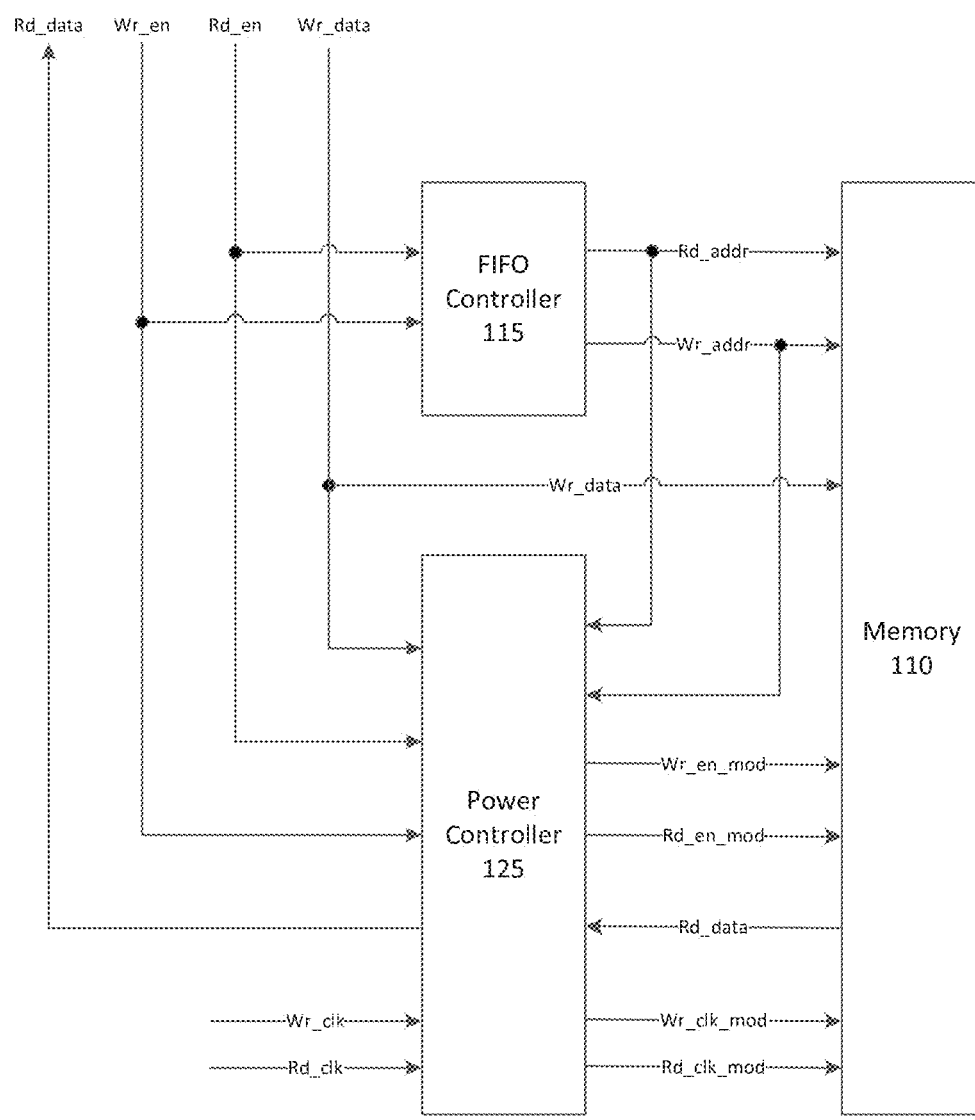
FIG. 3 illustrates a logic architecture according to an embodiment.

FIG. 3 illustrates a logic architecture 300 according to an embodiment. The logic architecture 200 may be represented by a power controller 125 in FIG. 3. The logic architecture 200 may be implemented as part of the existing FIFO memory 110 associated with the apparatus 100 in which the logic architecture 200 may automatically clock gate or power down the memory 110 based on a data toggle so that a user may be ignorant to the power saving memory access techniques. A user defined parameter may be implemented to determine whether power optimization is needed. If the data toggle rate is high and the logic seeking to access the memory 110 is important to a given application, a user may use a parameter setting to bypass the power controller.

If the databus is wide and the signals in the data bus can be classified as high and low toggling signals, then a user may separate out the high and low toggling signals as two separate data buses and use two FIFOs parallel to each other. A user may use a parameter setting to enable the power controller 125 for the low toggling data bus and ignore the power controller 125 for the high toggling data bus.

FIG. 4 illustrates rows of memory containing example data illustrating embodiments of the disclosure. In this example, a memory 110 having a depth of eighteen (18) rows may be illustrated. The column labeled "Wr_data" may contain the actual data contained in each of the 18 memory addresses as labeled by the column "Wr_addr". The column "Status" may contain the status bit setting for each of the 18 memory addresses. The column "Wr_en" may illustrate the setting for the write clock gate. The "Rd_data" column may illustrate whether the data in a particular write address may be new or the same as the previous write address.

Referring to the bottom row which is representative of write address "0", it is shown that the actual data stored is "A", the status bit may be set high to "1" because the data was new. In this case it is the first address for memory 110 and therefore automatically new since there is no previous address with which to compare. Since the status bit may be set high, the write enable may be also set to "1" to allow the write clock gate to access the write port of memory 110. Lastly, anytime the status bit is set high, the read data may be set to "new" to indicate that the data may be different from the data in the immediate previous memory address.

Referring to the second row from the bottom, it is shown that the data has not changed. Therefore, the status bit may be cleared to "0". An attempt to write the same data may be prevented because the write enable will be forced to "0" and the write port to memory 110 may be disabled by the write clock gate. An attempt read data may similarly be prevented because the read enable may be forced to "0" and the read port to memory 110 may be disabled by the read clock gate. The proper data may be sent out to the requester from a register outside the memory 110 that holds and may be updated with the data of the previous memory address when new data is written.

The third row from the bottom may behave exactly as the second row from the bottom because the data still has not changed. The fourth row from the bottom may see new data being written to memory 110. In this case, a comparison may have determined that the data is new. The status bit may be re-set to "1" and the write enable may be set to "1" allowing the write clock gate to access the write port to memory 110 and write the new data to the current memory address. The data may be read from this memory address because the status bit is set high meaning the read enable is also set thereby allowing the read clock gate to permit access to the read port of memory 110.

The remaining rows of memory 110 follow the same rules as set out for rows 0-3 above. Whenever the status bit is set high, the memory operates normally. However, whenever the status bit is cleared, it is indicative that the data has not changed and access to the memory may not be necessary.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
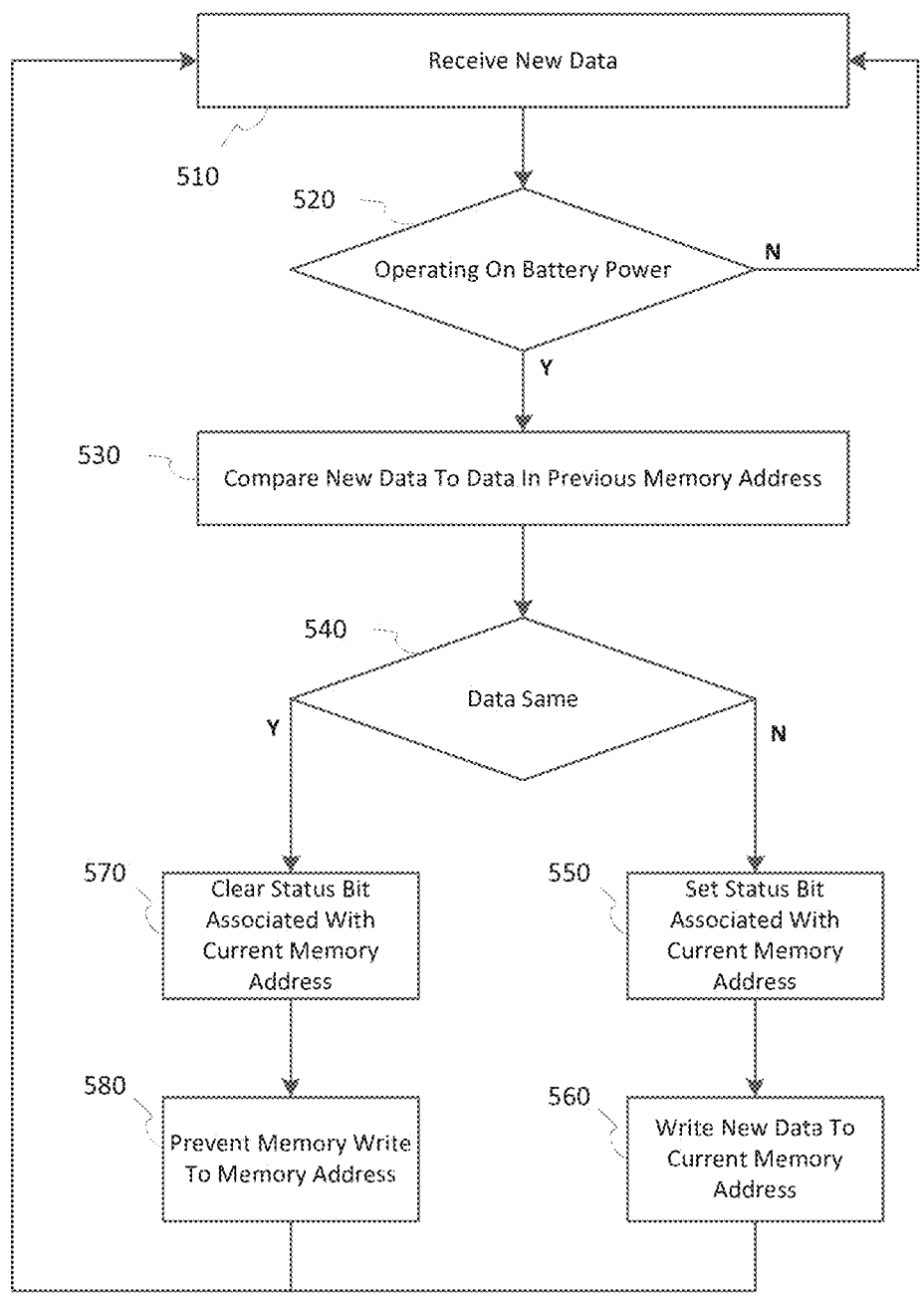
FIG. 5 illustrates one embodiment of a logic flow.

FIG. 5 illustrates one embodiment of a logic flow 500. The logic flow 500 may be representative of some or all of the operations executed by one or more embodiments described herein when performing write operations to memory 110.

In the illustrated embodiment shown in FIG. 5, the logic flow 500 may have the memory management component 120 receive new data at block 510. For example, the CPU 105 in executing an application, instruction, or command may need to write data to memory 110. The data to be written to a current memory address may be received at the memory management component 120. The embodiments are not limited in this context.

The logic flow 500 may have the memory management component 120 determine whether the apparatus 100 is operating on battery power at block 520. For example, the CPU 105, memory 110 and the other components of the apparatus draw power to operate. This power may come from an external DC power source or from battery power. Battery power is more finite than an external DC power source. Often times there is a desire to reduce the power needed to operate to extend the life of the battery. The memory management component 120 may determine or receive a signal indicating whether the apparatus 100 is operating on battery power. The embodiments are not limited in this context.

If the apparatus 100 is not operating on battery power, the memory system may operate as normal and await the next memory access instruction. If the apparatus 100 is operating on battery power, however, the logic flow 500 may have the memory management component 120 compare the new data to the data in the previous memory address at block 530. For example, before writing the new data to the current memory address, it may be determined whether the immediate previous memory address is contiguous with the current memory address. The new data may then be compared to the data in the immediate previous memory address. The embodiments are not limited in this context.

The logic flow 500 may have the memory management component 120 determine if the new data is the same as the data in the previous memory address at block 540. For example, if the results of the compare performed at block 530 determine that the new data is different from the data in the immediate previous memory address, the process may perform one set of steps as described by blocks 550 and 560 below. However, if the results of the compare performed at block 530 determine that the new data is the same as the data in the immediate previous memory address, the process may perform a different set of steps as described by blocks 570 and 580 below. The embodiments are not limited in this context.

The logic flow 500 may have the memory management component 120 set a status bit associated with the current memory address at block 550. For example, if the results of the compare performed at block 530 determine that the new data is different from the data in the immediate previous memory address, the memory management component 120 may set a status bit associated with the current memory address to indicate that the new data is different from the previous data. The embodiments are not limited in this context.

The logic flow 500 may have the memory management component 120 write the new data to the current memory address at block 560. For example, because the new data is different from the data in the immediate previous memory address, the memory management component 120 will write the new data to the current memory address. Control is then returned to block 510 to await reception of the next instance of new data to be written to memory. The embodiments are not limited in this context.

The logic flow 500 may have the memory management component 120 clear the status bit associated with the current memory address at block 570. For example, if the results of the compare performed at block 530 determine that the new data is the same as the data in the immediate previous memory address, the memory management component 120 may clear the status bit associated with the current memory address to indicate that the new data is the same as the previous data. The embodiments are not limited in this context.

The logic flow 500 may prevent a memory write to the memory address at block 580. For example, if the status bit has been cleared to indicate that the new data is the same as the previous data, the memory management component 120 may clock gate the write port to temporarily disable memory access. The clock gating will prevent power to the memory 110 component in situations when the data is not new. Alternatively, the memory management component 120 may force the write enable signal low to prevent access to memory 110. The end result is that the memory may only be written to when new data is presented. If there happens to be excessive repetition of data to consecutive memory addresses, the power savings may add up. Control is then returned to block 510 to await reception of the next instance of new data to be written to memory 110. The embodiments are not limited in this context.

Figure 6:
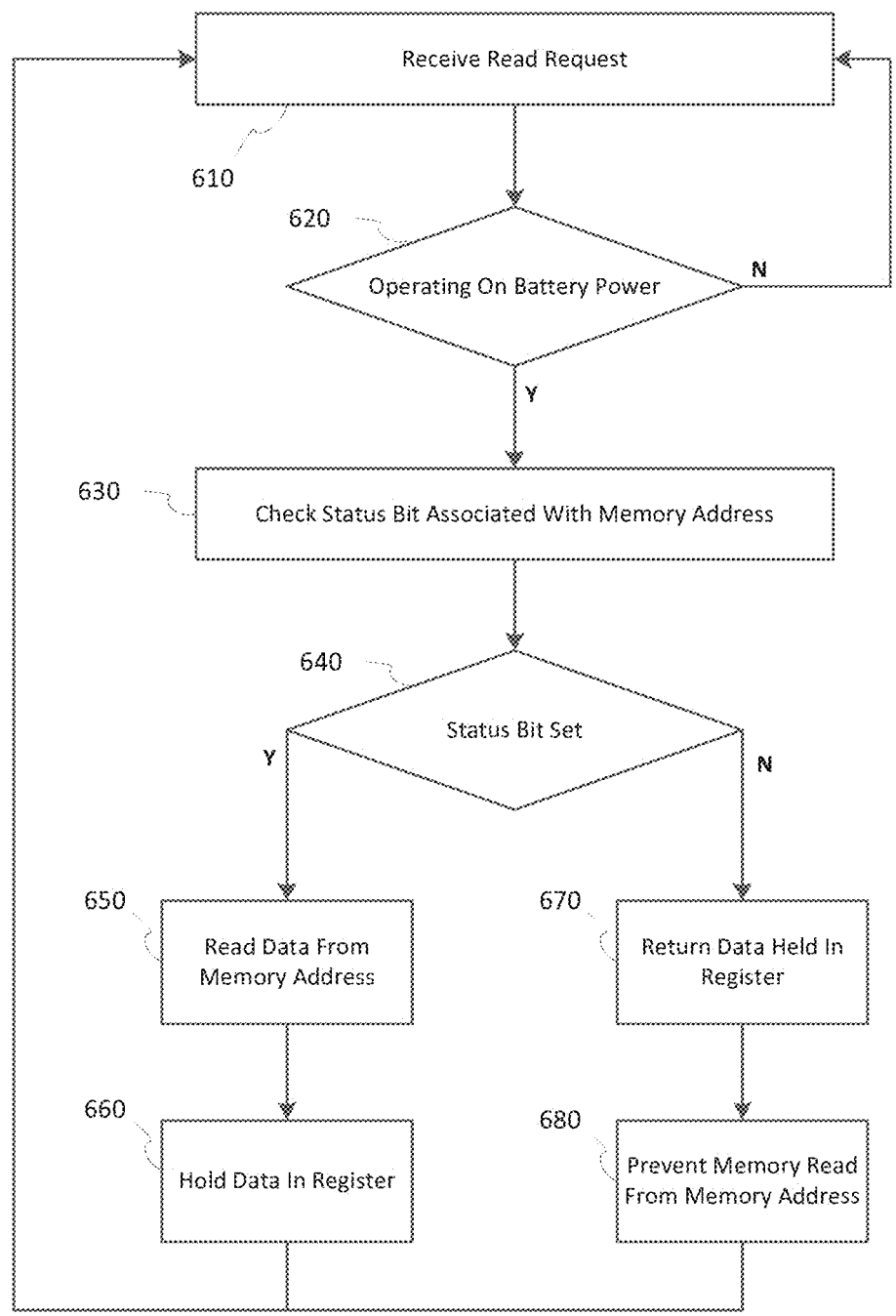
FIG. 6 illustrates one embodiment of a logic flow.

FIG. 6 illustrates one embodiment of a logic flow 600. The logic flow 600 may be representative of some or all of the operations executed by one or more embodiments described herein when performing read operations from memory 110.

In the illustrated embodiment shown in FIG. 6, the logic flow 600 may have the memory management component 120 receive a read request at block 610. For example, the CPU 105 in executing an application, instruction, or command may need to read data from memory 110. The data to be read from a current memory address may be stored in memory 110 and accessible via the memory management component 120. The embodiments are not limited in this context.

The logic flow 600 may have the memory management component 120 determine whether the apparatus 100 is operating on battery power at block 620. For example, the CPU 105, memory 110 and the other components of the apparatus draw power to operate. This power may come from an external DC power source or from battery power. Battery power is more finite than an external DC power source. Often times there is a desire to reduce the power needed to operate to extend the life of the battery. The memory management component 120 may determine or receive a signal indicating whether the apparatus 100 is operating on battery power. The embodiments are not limited in this context.

If the apparatus 100 is not operating on battery power, the memory system may operate as normal and await the next memory access instruction. If the apparatus 100 is operating on battery power, however, the logic flow 600 may have the memory management component 120 check the status bit associated with the current memory address at block 630. For example, before reading data from the current memory address, the status bit for the current memory address may be checked to determine the data to be read is different from the data in the immediate previous memory address. The embodiments are not limited in this context.

The logic flow 600 may have the memory management component 120 determine if the status bit associated with the current memory address is set or cleared at block 640. For example, if the results of the check performed at block 630 determine that the status bit is set, the process may perform one set of steps as described by blocks 650 and 660 below. However, if the results of the check performed at block 630 determine that the status bit is cleared, the process may perform a different set of steps as described by blocks 670 and 680 below. The embodiments are not limited in this context.

The logic flow 600 may have the memory management component 120 read data from the current memory address at block 650. For example, if the results of the compare performed at block 630 determine that the status bit is set, the memory management component 120 may read data from the current memory address because the status bit being set indicates that the data in the current memory address is different than the data in the previous memory address. The embodiments are not limited in this context.

The logic flow 600 may have the memory management component 120 hold the just read data from the current memory address in a register at block 660. For example, because the read data is different from the data in the immediate previous memory address, the memory management component 120 will read the data from the current memory address and hold it in a register outside the memory 110 in case the status bit is cleared for the next read request. Control is then returned to block 610 to await reception of the next instance of new data to be written to memory. The embodiments are not limited in this context.

The logic flow 600 may have the memory management component 120 return data held in the register at block 670. For example, if the status bit is cleared as determined at block 640, the memory management component 120 may return data held in the register because it is the same as what was in the previous memory address. Because the register is outside the memory 110 there is no need to expend resources accessing the memory 110 to obtain the requested data. The embodiments are not limited in this context.

The logic flow 600 may prevent reading from the memory address at block 680. For example, if the status bit has been cleared to indicate that the new data is the same as the previous data, the memory management component 120 may clock gate the read port to temporarily disable memory access. The requested data has already been returned to the requesting component via the register outside the memory 110. The clock gating will prevent power to the memory 110 component in situations when the data is not new. Alternatively, the memory management component 120 may force the read enable signal low to prevent access to memory 110. Forcing the read enable signal to the memory to "0" keeps the read address unchanged when the status bit is "0". The end result is that the memory may only be read from when the data in the current memory address is different from data in the immediate previous memory address. If there happens to be excessive repetition of data to consecutive memory addresses, the power savings may add up. Control is then returned to block 610 to await reception of the next instance of new data to be read from memory 110. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 7:
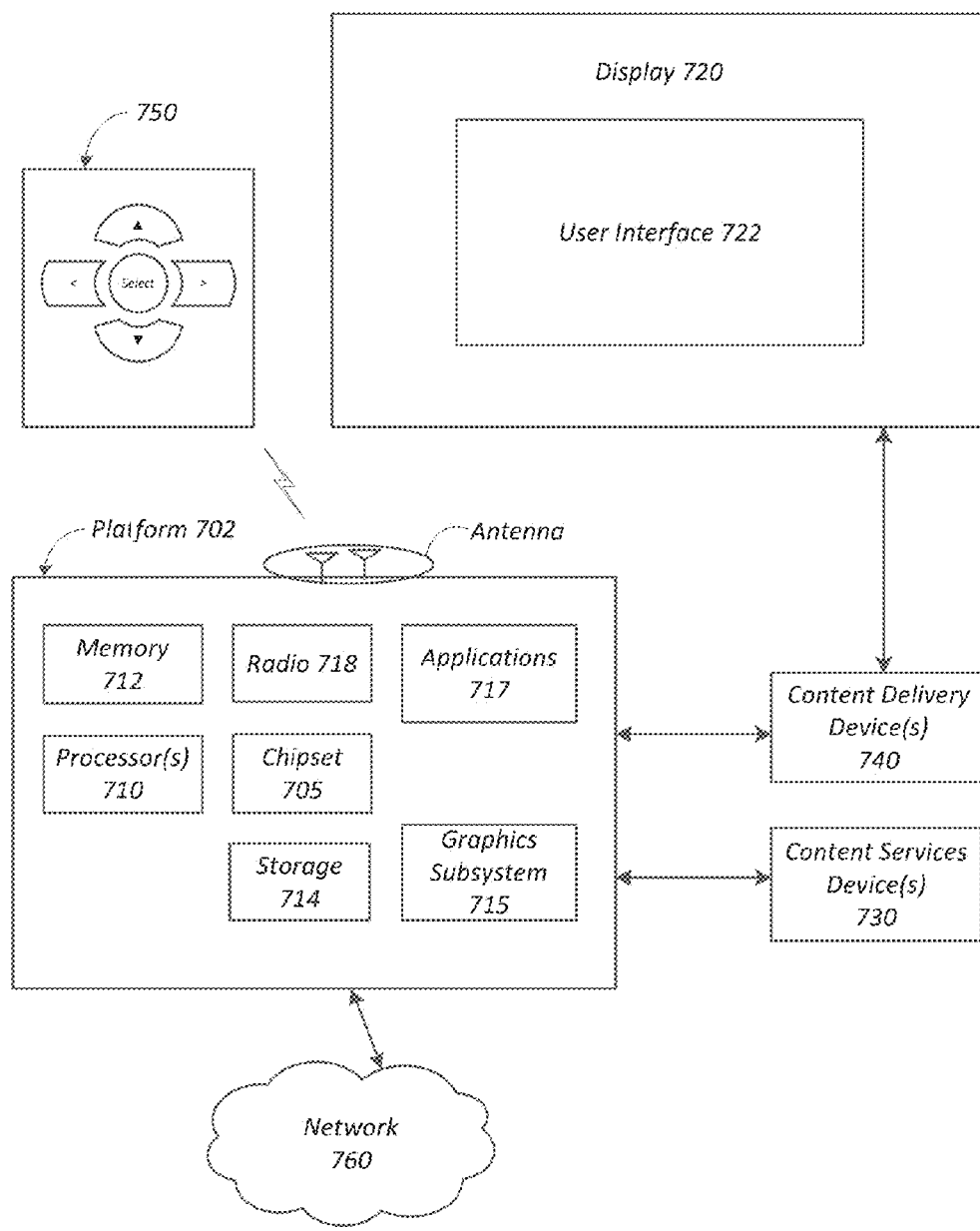
FIG. 7 illustrates an embodiment of a system that may be suitable for implementing embodiments of the disclosure.

FIG. 7 illustrates an embodiment of a system 700 that may be suitable for implementing the memory access processing embodiments of the disclosure. In embodiments, system 700 may be a system capable of implementing the memory access embodiments described above although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor(s) 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor(s) 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor(s) 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/or display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
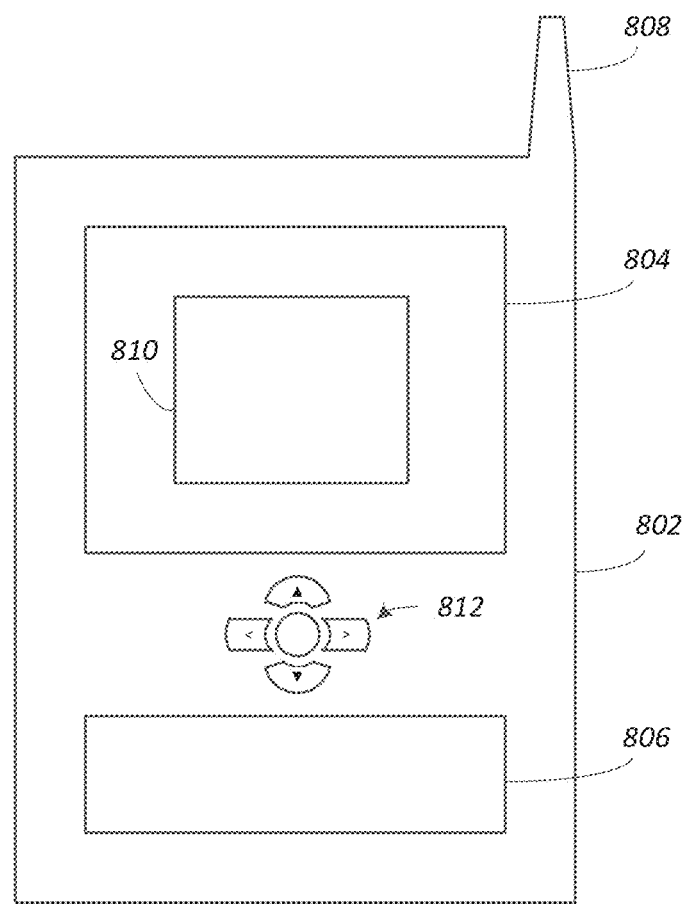
FIG. 8 illustrates embodiments of a small form factor device in which the system of FIG. 7 may be embodied.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected"

along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processing component; and
   a memory manager component operative on the processing component to manage a memory with a set of memory address locations, the memory manager component to:
      maintain a status register outside of the memory, the status register to include an associated status bit for each of the set of memory address locations, each status bit to indicate whether data in the associated memory address location is the same as data in an immediately contiguous previous memory address location of the memory;
      prevent writing data to a memory address location of the memory when the memory address location is contiguous with respect to an immediately previous memory address location and the data to be written is the same as data stored in the immediately contiguous previous memory address location of the memory by setting the status bit associated with the memory address location;
      and prevent reading data from the memory address location of the memory when the data stored in the memory address location is the same as the data stored in the immediately contiguous previous memory address location of the memory as determined from the status bit associated with the memory address location.

2. The apparatus of claim 1, the memory management component operative to:
   determine when the data to be written to the memory address location is the same as the data in the immediately contiguous previous memory address location; and
   when the data is the same: clear the status bit associated with the memory address location; and disable a write port for the memory.

3. The apparatus of claim 2, the memory management component operative to:
   disable the write port for the memory by clock gating the write port.

4. The apparatus of claim 2, the memory management component operative to:
   disable the write port for the memory by forcing a write enable signal to the memory low.

5. The apparatus of claim 1, the memory management component operative to:
   receive a read request associated with a memory address location;
   check the status bit associated with the memory address location; and
   while the status bit is set:
      read the data from the memory address location; and
      hold the data in a register outside the memory; and
   while the status bit is cleared:
      return the data held in the register; and
      disable a read port for the memory.

6. The apparatus of claim 5, the memory management component operative to disable the read port for the memory by clock gating the read port.

7. The apparatus of claim 5, the memory management component operative to disable the read port for the memory by forcing a read enable signal to the memory low.

8. The apparatus of claim 1, the memory management component operative to:
   prevent writing data to a memory address location when the data is the same as the data in the immediately contiguous previous memory address location only while a battery is powering the processing component; and
   prevent reading data from a memory address location when the data is the same as the data in the immediately contiguous previous memory address location only while a battery is powering the processing component.

9. The apparatus of claim 8, the memory management component operative to:
   prevent writing data to a memory address location when the data is the same as the data in the immediately contiguous previous memory address location when the battery is below a threshold percentage of remaining battery power; and
   prevent reading data from a memory address location when the data is the same as the data in the immediately contiguous previous memory address location when the battery is below a threshold percentage of remaining battery power.

10. The apparatus of claim 1, wherein the memory is a first in, first out (FIFO) memory.

11. A method, comprising:
    maintaining a status register outside of a memory with a set of memory address locations, the status register including an associated status bit for each of the set of memory address locations, each status bit to indicate whether data stored in the associated memory address location is the same as data stored in an immediately contiguous previous memory address location of the memory;

receiving data resulting from execution of a central processing unit (CPU) instruction, the data to be written to a memory address location of the memory;

preventing writing the data resulting from execution of the CPU instruction when the memory address location is contiguous with respect to an immediately previous memory address location and the data to be written is the same as data stored in the immediately contiguous previous memory address location of the memory by setting the status bit associated with the memory address location;

receiving a read request for the memory address location;

preventing reading data from the memory address location when the data stored in the memory address location is the same as the data stored in the immediately contiguous previous memory address location as determined from the status bit associated with the memory address location; and using data stored in a register outside the memory that is the same as the data stored in the immediately contiguous previous memory address location to satisfy the read request when the data stored in the memory address location is the same as the data stored in the immediately contiguous previous memory address location.

12. The method of claim 11 comprising:
determining when the data to be written to the memory address location is the same as the data in the immediately contiguous previous memory address location; and
when the data is different:
setting the status bit associated with the memory address location; and
writing the data to the memory address location; and
when the data is the same:
clearing the status bit associated with the memory address location; and
disabling a write port for the memory.

13. The method of claim 12, comprising disabling the write port for the memory by clock gating the write port.

14. The apparatus of claim 12 comprising disabling the write port for the memory by forcing a write enable signal to the memory low.

15. The method of claim 11 comprising:
checking the status bit associated with the memory address location; and
while the status bit is set:
reading the data from the memory address location; and
holding the data in the register; and
while the status bit is cleared:
returning the data held in the register; and
disabling a read port for the memory.

16. The method of claim 15, comprising disabling the read port for the memory by clock gating the read port.

17. The apparatus of claim 15 comprising disabling the read port for the memory by forcing a read enable signal to the memory low.

18. The method of claim 13 comprising:
preventing writing data to memory only while the memory is operating on battery power; and preventing reading data from memory only while the memory is operating on battery power.

19. An article of manufacture comprising a non-transitory computer-readable storage medium containing instructions that when executed enable a system to:
maintain a status register outside of a memory with a set of memory address locations, the status register to include an associated status bit for each of the set of memory address locations, each status bit to indicate whether data stored in the associated memory address location is the same as data stored in an immediately contiguous previous memory address location of the memory;
prevent writing data to a memory address location of a memory when the data to be written is the same as data stored in an immediately contiguous previous memory address location of the memory by setting the status bit associated with the memory address location; and
prevent reading data from the memory address location of the memory when the data stored in the memory address location is the same as the data stored in the immediately contiguous previous memory address location of the memory as determined from the status bit associated with the memory address location.

20. The article of claim 19, further comprising instructions that when executed enable the system to:
determine when the data to be written to the memory address location is the same as the data in the immediately contiguous previous memory address location; and
when the data is the same:
clear the status bit associated with the memory address location; and
disable a write port for the memory.

21. The article of claim 20, further comprising instructions that when executed enable the system to disable the write port for the memory by clock gating the write port.

22. The article of claim 20, further comprising instructions that when executed enable the system to disable the write port for the memory by forcing a write enable signal to the memory low.

23. The article of claim 19, further comprising instructions that when executed enable the system to:
receive a read request associated with a memory address location;
check the status bit associated with the memory address location; and
while the status bit is set:
read the data from the memory address location; and
hold the data in a register outside the memory; and
while the status bit is cleared:
return the data held in the register; and
disable a read port for the memory.

24. The article of claim 23, further comprising instructions that when executed enable the system to disable the read port for the memory by clock gating the read port.

25. The article of claim 23, further comprising instructions that when executed enable the system to disable the read port for the memory by forcing a read enable signal to the memory low.

26. The article of claim 19, further comprising instructions that when executed enable the system to:
prevent writing data to a memory address location when the data is the same as the data in the immediately contiguous previous memory address location only while the system is operating on battery power; and
prevent reading data from a memory address location when the data is the same as the data in the immediately contiguous previous memory address location only while the system is operating on battery power.

27. A system, comprising:
a processing component;
a first-in, first-out (FIFO) memory with a set of memory address locations; and
a memory manager component operative on the processing component to:
  maintain a status register outside of the FIFO memory, the status register to include an associated status bit for each of the set of memory addresses, each status bit to indicate whether data in the associated memory address location is the same as data in an immediately contiguous previous memory address location of the memory;
  prevent writing data to a memory address of the FIFO memory when the write address location is contiguous with respect to an immediately previous address location and the data is the same as data in the immediately contiguous previous memory address location of the FIFO memory by setting the status bit associated with the memory address location; and
  prevent reading data from the memory address location of the FIFO memory when the data is the same as the data in the immediately contiguous previous memory address location of the FIFO memory as determined from the status bit associated with the memory address location.

28. The system of claim 27, the memory management component operative to:
  determine when the data to be written to the memory address location is the same as the data in the immediately contiguous previous memory address location; and
  when the data is the same:
    clear the status bit associated with the memory address location; and
    disable a write port for the FIFO memory.

29. The system of claim 28, the memory management component operative to:
  disable the write port for the FIFO memory component by clock gating the write port.

30. The system of claim 28, the memory management component operative to:
  disable the write port for the FIFO memory by forcing a write enable signal to the memory low.

31. The system of claim 27, the memory management component operative to:
  receive a read request associated with a memory address of the FIFO memory;
  check the status bit associated with the memory address location; and
  while the status bit is set:
    read the data from the memory address location; and
    hold the data in a register outside the FIFO memory; and
  while the status bit is cleared:
    return the data held in the register; and
    disable a read port for the FIFO memory.

32. The system of claim 31, the memory management component operative to disable the read port for the FIFO memory by clock gating the read port.

33. The system of claim 31, the memory management component operative to disable the read port for the FIFO memory by forcing a read enable signal to the memory low.

* * * * *